United States Patent [19]
Eguchi et al.

[11] 3,813,469
[45] May 28, 1974

[54] METHOD FOR HEATING VACUUM DEGASSING CONTAINER

[75] Inventors: Isamu Eguchi, Nagoya; Susumu Hiratake, Kasugai, both of Japan

[73] Assignee: Daido Seiko Kabushiki Kaisha, Nagoya-shi, Japan

[22] Filed: Apr. 9, 1973

[21] Appl. No.: 348,893

[52] U.S. Cl. .......................................... 13/9, 13/31
[51] Int. Cl. ............................................. H05b 7/18
[58] Field of Search .............................. 13/1, 31, 9

[56] References Cited
UNITED STATES PATENTS
3,479,022  11/1969  Coupette ........................... 13/31 X

*Primary Examiner*—Roy N. Envall, Jr.

[57] ABSTRACT

A method for heating a vacuum degassing container, disposing a plasma torch and an anode in a vacuum degassing container and using plasma jet or plasma arc produced between the torch and the anode as a heat source.

3 Claims, 7 Drawing Figures

METHOD FOR HEATING VACUUM DEGASSING CONTAINER

BACKGROUND OF THE INVENTION

The present invention relates to a method for heating a vacuum degassing container in the vacuum degassing process for degassing a molten metal, particularly steel in vacuum.

For the so-called degassing equipment by which molten steel is received with a ladle, etc. and a part of so received steel is drawn up repeatedly into a vacuum container for vacuum refining, the degassing container must be heated to a prescribed temperature above 1,200° C chiefly for the purpose of reducing the temperature drop of molten steel while the molten steel passes through the vacuum container and preventing deterioration of composition in the next charge as a result of sticking of splash to the container wall.

There are hitherto known various methods for heating the vacuum degassing container of this type, but all such methods have respective drawbacks. That is, in the heating method of arc type the heating in vacuum is difficult and, moreover, the arc discharge phenomenon itself is unstable and difficult to control; accordingly, it cannot make a uniform heat source. In the heating method by way of graphite resistance, the electrical resistance of graphite is small and, therefore, a large amount of electric current is required for generating heat, making complicated the sealing of the electrode part and generally bringing about a greater energy loss; furthermore, the graphite making a heat generating body is gradually consumed and thereby increases resistance, resulting in the reduction of output power. Besides, since graphite as a heat generating body is disposed in a relatively low position to effectively heat the vacuum degassing container, the violent boiling phenomenon of molten steel at the time of degassing accelerates the consumption of graphite and the consequent carburization often deteriorates the purity of steel. On the other hand, the heating method by means of combustion burners also has various drawbacks; heating during vacuum degassing is difficult; as sufficient temperature elevation above 1,200° C is not possible; the temperature of molten steel falls markedly during degassing; the splash having stuck to the degassing container during degassing is oxidized and causes the deterioration of composition of the molten steel in the next charge.

SUMMARY OF THE INVENTION

The present invention provides a method for heating the degassing container, arranging a plasma torch and an anode in a degassing container and using, as heat source, the plasma jet or plasma arc generated between the said torch and the said anode.

The present invention also provides a method, in the method described above, for heating the degassing container by forcibly circulating and jetting the atmosphere gas inside the said container to the said anode.

The present invention is an improvement in the said conventional means removing the drawbacks therefrom, by effective utilization of plasma jet or plasma arc (expressed as "plasma jet" hereinafter). The plasma jet generated from a plasma torch by known means permits the use of inactive gas as a working gas and is very stable electrically, easily enabling the maintenance of high temperatures as high as several million degrees, and exhibits a good directionality of heat transfer. However, if a plasma torch is used in place of the burner of the conventional burner system and a plasma jet is used as a heat source for directly heating a degassing container, the good directionality in heat transfer works adversely liable to cause hot spots; or the thermal efficiency is low because of a small quantity of radiationally transferred heat and also of a small quantity of convectionally transferred heat as a result of restricting flow rate of working gas for stabilization of plasma and maintenance of high temperature. If the number of plasma torch is increased to compensate therefor, there arises another difficulty that the structure becomes complicated and workability is deteriorated.

The present invention makes the best use of the above-mentioned characteristics of the plasma jet and removes such drawbacks mentioned in other methods. To express in another way, against a known plasma torch, for instance, a plasma torch comprising a tungsten cathode and a nozzle for constricting plasma provided surrounding the cathode and used in such a manner as to pour a working gas from a gap between the cathode and the nozzle, an anode of high melting point metal like graphite having a proper shape is provided forming a pair with the said plasma torch, and such combination is placed in proper place, thus generating plasma jet between the said plasma torch and the said anode. The inactive gas plasma is constricted by said nozzle, becomes electrically stable and is held in a high temperature state as high as several million degrees, is excellent in directionality, thus heating said anode to high temperatures from 2,000° to 4,000° efficiently and quickly. The said anode proper in shape for adapting to the vacuum degassing container and disposed in a proper position acts thus as a red-hot radiation source for the vacuum degassing container and can heat the vacuum degassing container quickly and securely in inactive atmosphere to a desired temperature. Moreover, the anode and plasma torch may be installed on a relatively high position, and the volume of the plasma working gas is so small compared with the vacuum evacuating volume that molten steel can be heated even during degassing treatment without contamination of molten steel.

The said invention, in some cases, depending upon the dimension and shape of a vacuum degassing container, may require several pairs of the plasma torch and anode, make the shape of the anode excessively large, or overheat the anode. In consequence, for the reason that if the vacuum degassing container can preliminarily be heated to sufficiently high temperature, heating during degassing is not necessarily required, a further favorable method is found, in addition to the method already described, by blowing a non-oxidizing circulating gas such as nitrogen to the red-hot anode, bringing about means for achieving the effect of conventional heat transfer (FIGS. 2 through 7). In the same manner as above, a plasma torch and a high melting point metal like graphite are provided in a vacuum degassing container and, further, a gas jet nozzle is provided eccentrically to cause swirling stream on the side wall of the vacuum degassing container and slightly downwards to jet the stream toward the anode, also providing an exhaust opening in the upper portion of the vacuum degassing container. In the same manner as above, the plasma jet generated in the plasma torch and the anode is stable, high in temperature, and maintains the directionality of heat transfer, thus heating the anode to elevate the temperature. In this condition, when a circulating gas is jetted by a heat-resistant blower installed outside from the gas jet nozzle through an air blast duct, the anode is maintained at a proper temperature and reduces the consumption thereof; on the other hand, the gas gains heat therefrom to elevate the temperatures thereof, thereby producing a wind of swirling gas high in temperature inside the vacuum degassing container. The high temperature gas is drawn out from the gas exhaust opening above, cooled to proper temperatures by a cooling means such as cooling gas mixer or heat exchanger, and led through the air blast duct to the heat-resistant blower, thus forming a closed loop. As described above, not only is the consumption of the anode reduced, but the heating output may be easily increased; moreover, in addition to these radiation heats transfer is added the convection heat transfer. A method is found as described above which can heat vacuum degassing containers in various sizes and shapes quickly and securely and, furthermore, as uniformly as possible. In the following, two embodiments of this invention will be explained.

DESCRIPTION OF THE PREFERRED EMBODIMENT

Figure 1:
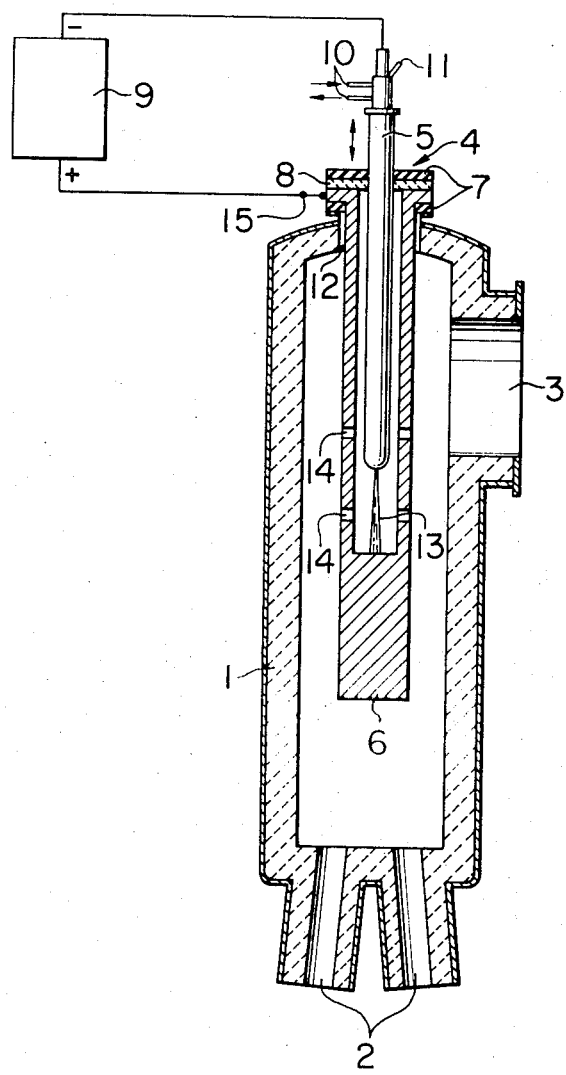
FIG. 1 is a longitudinal cross-sectional view showing an equipment suitable for putting the method of this invention into practice.

FIG. 1 illustrates an embodiment in which a plasma torch and a high melting point metal like graphite are set in a pair in a vacuum degassing container and the high melting point metal is heated by applying plasma to heat the vacuum degassing container utilizing the radiation heat therefrom.

In FIG. 1, the reference numeral 1 indicates a vacuum degassing container lined with refractory material on an iron plate thereof, 2 inlet and outlet openings for pouring molten steel during degassing process, 3 an evacuation opening for creating vacuum communicating with a vacuum pump not shown through a vacuum valve not shown, and 4 a unit comprising a known plasma torch 5, an anode 6 of a high melting point metal like graphite, an insulator 7 for thermally insulating the plasma torch 5 and the anode 6, a refractory material 8, and a vacuum seal by a proper known means not shown in the figure. The reference numeral 9 indicates a direct-current source for supplying electric power through a terminal 15 between a cathode, not shown, of the plasma torch 5 and the anode 6. The numeral 10 indicates water supply and discharging openings for cooling the plasma torch 5; 11 indicates an opening for pouring plasma gas introducing thereinto an inactive gas such as argon as plasma working gas. The numeral 12 indicates an opening for inserting the unit 4 which is sealed by a blind lid, not shown, after taking out the unit 4 when the vacuum degassing container 1 does not require heating particularly during vacuum degassing treatment.

The procedure of practising will be explained for FIG. 1 in the following. The blind lid of the insertion opening 12 is first removed and the unit 4 is inserted. By a mechanism for elevating and lowering the plasma torch by a proper means not shown, a distance of about 100 mm is provided between the end of the plasma torch and the bottom of the anode 6, pouring a working gas through the gas pouring opening 11 of the plasma torch 5. Applying a voltage from the direct-current power source 9 across the plasma torch and the anode, a pilot arc is produced in the plasma torch 5 by proper and known means for producing pilot arc, for instance, by the application of high frequency alternating voltage from a high frequency alternating power source not shown. When the plasma torch 5 is then approached to the bottom of the anode 6 by the unshown plasma torch elevating and lowering mechanism, plasma jet is generated. After that, by elevating the plasma torch 5 again to provide a gas of 100 to 400 mm in length to the bottom of the anode 6, a stable plasma jet 13 is obtained. The plasma jet thus obtained, possessing the above-mentioned characteristic, can heat the bottom portion quickly and effectively to high temperatures of red heat. In case the shape of the anode 6 is formed as shown in FIG. 1, the volume of the upper portion is small as compared with the lower portion subjected to the plasma jet 13 and, therefore, the heat in the lower portion is quickly transferred to the upper portion possessing small heat capacity, thus exposing the whole anode 6 to red heat. The plasma jet 13 thus transfers heat to the lower portion of the anode 6 effectively, and the rest of the gas escapes outside through gas vent holes 14 and the steel pouring openings 2, or the vacuum evacuation opening 3 during the vacuum degassing treatment. The heat transferred to the lower portion of the anode 6 spreads all over the upper portion of the anode 6, and the whole anode thereby makes a red-hot radiation source, enabling the whole vacuum degassing container to be heated effectively, quickly, and uniformly. Since the plasma torch 5 and the anode 6 are composed as a unit 4, the present method for heating vacuum degassing container possesses the following features: the unit may be inserted and taken out easily; the installing portion of the unit 4 is on the roof portion and located far from a part of the highest temperature (a lower part) demanded for heating a vacuum degassing container and the unit-installed part may accordingly be easily cooled locally, thereby reducing the damage due to heat; the anode 6 is situated relatively high against the bottom of the vacuum degassing container 1 and, consequently, the contamination of molten steel by the electrode is small even in the course of heating during the vacuum degassing treatment.

Figure 2:
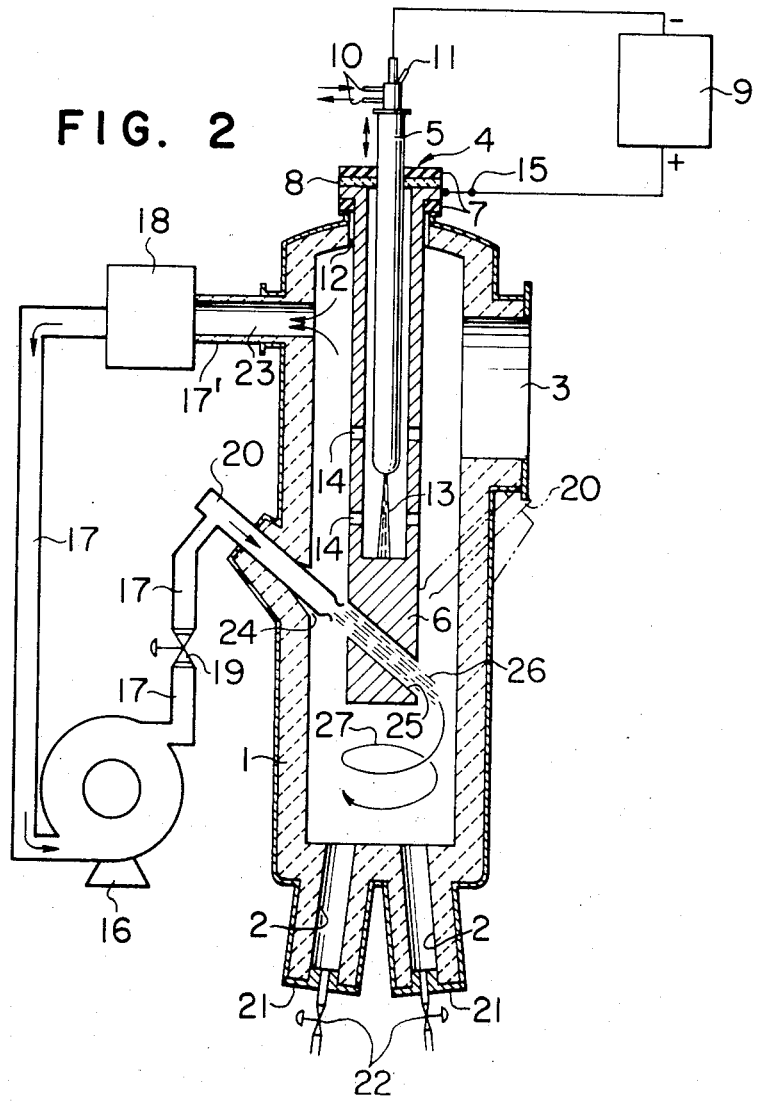
FIG. 2 is a longitudinal cross-sectional view of an equipment suitable for putting a more favorable method into practice.
Figure 3:
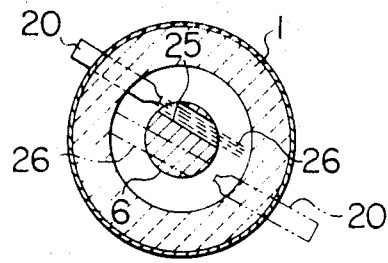
FIG. 3 is a transverse cross-section of FIG. 2.
Figure 4:
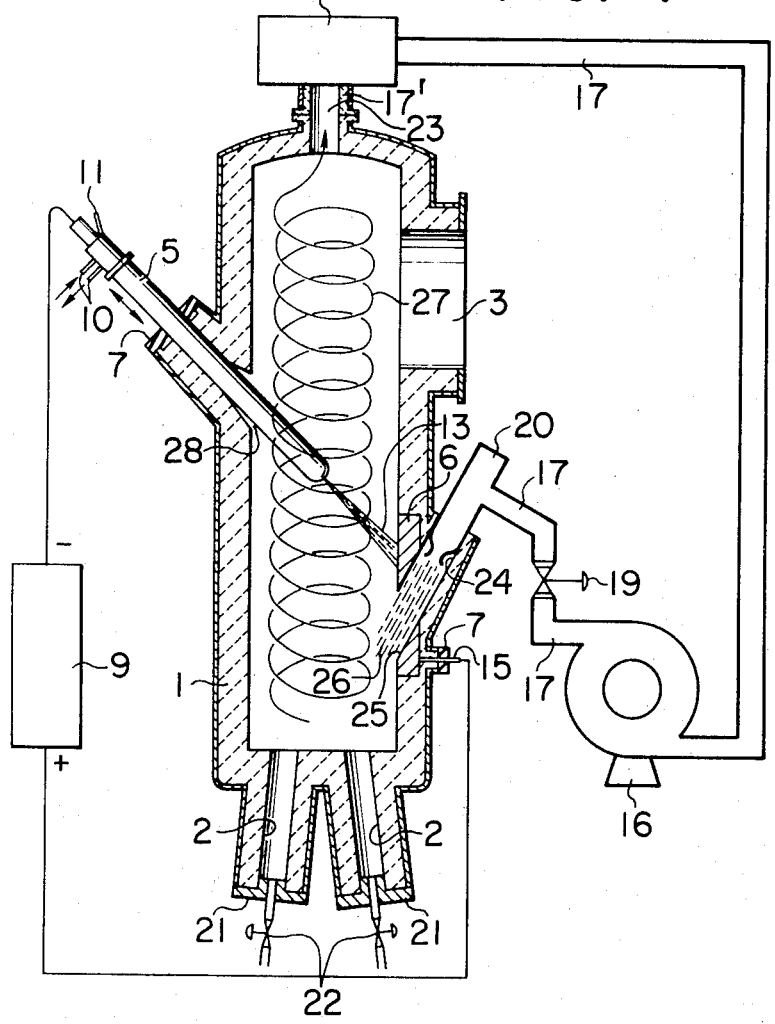
FIG. 4 is a longitudinal cross-sectional view of an equipment for practising another method with the same purpose.
Figure 5:
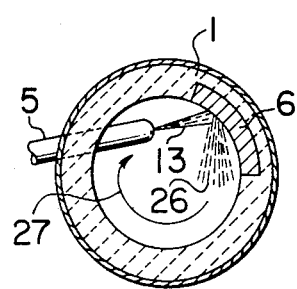
FIG. 5 is a transverse cross-sectional view of FIG. 4.
Figure 6:
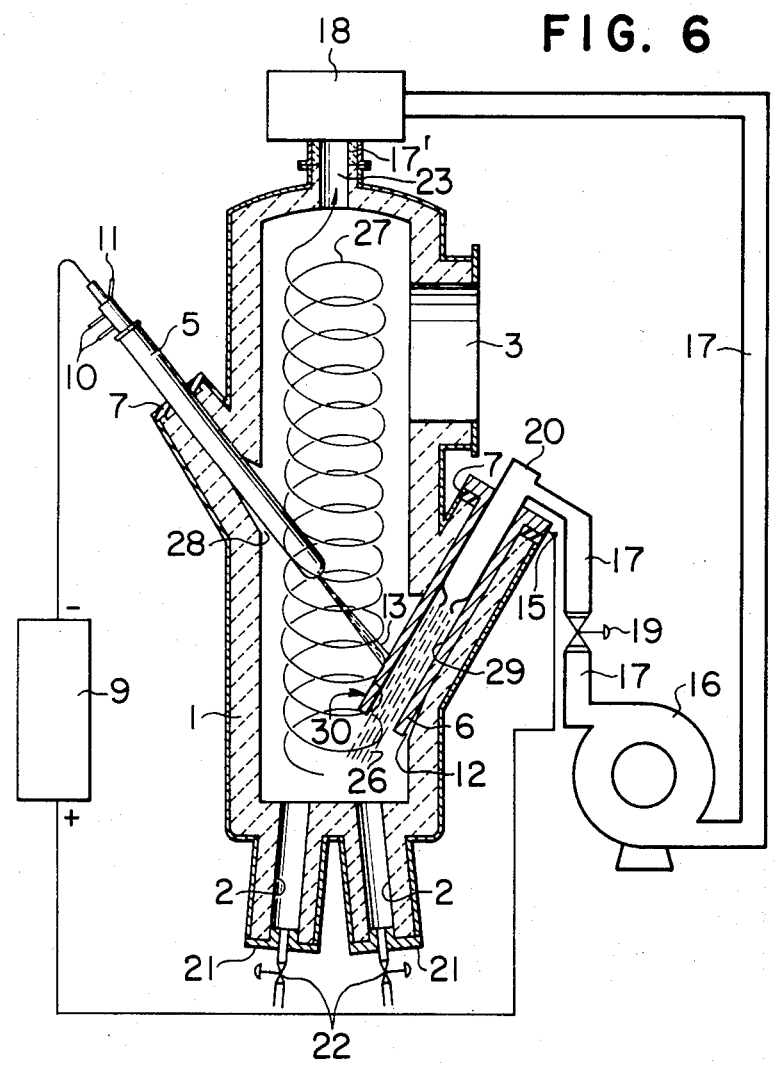
FIG. 6 is a longitudinal cross-sectional view of an equipment for practising the other method.
Figure 7:
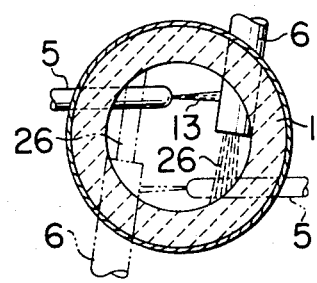
FIG. 7 is transverse cross-sectional view of FIG. 6.

FIGS. 2, 4 and 6 show examples in which, in addition to the invention disclosed in FIG. 1, an equipment for circulating the gas inside the container is provided outside the vacuum degassing container to propose a method for heating the lower portion of the vacuum degassing container quickly and effectively to higher temperatures. the composition and arrangement of these embodiments are shown in schematic horizontal cross-sectional arrangement drawing in FIGS. 3, 5 and 7, corresponding respectively to FIGS. 2, 4 and 6. To explain the details of each part, the reference numeral 1 represents a vacuum degassing container lined with refractory material on an iron plate thereof, 2 an inlet and outlet openings for pouring molten steel undergoing the degassing treatment, 3 an evacuation opening for creating vacuum communicating with an unshown vacuum pump through an unshown vacuum valve, 5 a known plasma torch, 6 an anode of a high melting point metal like graphite, 7 an insulator for insulating the plasma torch and the anode or the vacuum degassing container from one another, 8 a refractory material (FIG. 2), 9 a direct-current power source applied across a cathode, not shown, inside the plasma torch and the anode, 10 water supply and discharge openings for cooling the plasma torch, 11 an opening for introducing plasma gas to pour an inactive gas such as argon as a plasma working gas, 12 an opening for inserting a plasma torch, 13 plasma jet heading toward the anode 6 from the end of the plasma torch 5, 14 vent holes (FIG. 2), 15 a terminal for supplying electric current to the anode, 16 a heat-resistant blower for circulating the atmosphere gas inside the vacuum degassing container 1, 17 and 17' are air blast ducts with or without lining of refractories for guiding circulating gas, 18 a gas cooler by known means such as cooling gas mixing or heat exchange for cooling the circulating gas down to the temperature which the heat-resistant blower can withstand, 19 a valve for controlling the gas flow rate for adjusting the flow rate of the circulating gas, 20 a nozzle for jetting the circulating gas, 21 blind lids having an adjusting valve 22 for controlling the atmosphere pressure inside the vacuum degassing container, 23 an exhaust opening for the atmosphere provided in the upper portion of the vacuum degassing container, 24 an opening for inserting and mounting the gas jetting nozzle 20 (FIGS. 2 and 4), 25 a passage opening for jet gas provided in the anode 6 (FIGS. 2 and 4), 26 jet gas, 27 stream of the atmosphere gas swirling inside the vacuum degassing container, 28 an opening for inserting and mounting the plasma torch (FIGS. 4 and 6), 29 an opening for inserting a jet nozzle into the anode 6 (FIG. 6). The reference numeral 4 indicates a plasma torch-anode unit composed by assembling the plasma torch 5, anode 6, insulator 7, and refractory material 8 in a set (FIG. 2) and the numeral 30 represents a nozzle — anode unit composed by assembling a nozzle 20 for jetting the circulating gas, an anode 6, and an insulator 7 in a set in FIG. 6, this units being inserted and mounted through a unit inserting opening 12 respectively.

In the methods shown in FIGS. 2, 4 and 6 the gas circulating mechanism consisting of the air blast duct 17, gas cooler 18, heat-resistant blower 16, adjustment valve 19 for circulating gas flow rate, etc, as well as the direct-current power source 9 is set in advance at a predetermined position. The vacuum evacuating opening 3 and the molten steel flowing-in and -out opening 2 are hermetically closed when heating the degassing container, and released by opening the valve or removal when undergoing the vacuum degassing treatment with the aid of an unshown vacuum valve or a blind lid 21 having an atmosphere gas adjusting valve 22. In the circulating gas exhausting opening 23, unit inserting opening 12 (FIGS. 2 and 6), gas jet nozzle inserting and mounting opening 24 (FIGS. 2 and 4), and plasma torch inserting and mounting opening (FIGS. 4 and 6) are respectively inserted and mounted the air blast duct 17' lined with refractories communicating with the gas cooler 18, plasma torch-anode unit 4 or nozzle-anode unit 30, gas jetting nozzle 20, and the plasma torch, when heating the degassing container. When undergoing the vacuum degassing treatment, those openings are hermetically closed with proper blind lids not shown in the drawing.

When heating the vacuum degassing container, plasma is generated in the same manner as in FIG. 1 after the above prescribed setting is completed. By a mechanism for elevating and lowering the plasma torch through an unshown proper means, a gas of about 100 mm is formed between the end of th plasma torch 5 and a point, radiated by the plasma, of the anode 6, and a working gas is poured through the gas flowing opening 11 of the plasma torch 5, applying voltage from the direct-current power source 9 across the plasma torch and the anode and producing a pilot arc in the plasma torch 5 by a known means for generating pilot arc; when the plasma torch is thereafter approached to the anode 6 by the unshown elevating and lowering mechanism, plasma jet is produced. When the plasma torch is later pulled up to adjust the distance to the anode, stable plasma jet 13 is obtained. The plasma thus obtained is electrically very stable and high in temperature and transfers heat in a jet-like state with a good directionality to the anode 6, thus heating the anode 6 quickly and effectively to red heat. When the heat-resistant blower 16 is operated thereafter to jet the jet gas 26 from the gas jet nozzle 20 toward the anode 6, thereby preventing consumption due to overheating as the result of heat exchange with the anode 6 as well as elevating the jet gas temperature so that stream of high temperature gas appears in the vacuum degassing container 1. The pressure inside the container is held constant by means of the atmosphere pressure adjusting valve 22. The high temperature gas is drawn out through the exhaust opening 23 in the upper portion of the degassing container and cooled by the gas cooler 18 to a temperature which the heat-resistant blower 16 can withstand, being therefore guided the air blast duct to the heat-resistant blower so that the gas circulation is repeated. The heat exchange between the jet gas 26 and the anode 6 is controlled properly by the adjustment valve 19 of the circulating gas flow rate. The nozzle for jetting gas may be replaced by a burner consuming a small amount of fuel so as to increase the temperature elevating velocity.

In the manner as above described, by the radiation heat from the anode receiving heat from the plasma jet to red heat and maintained at a constant temperature and the forced convection heat due to the stream of the circulating gas elevated in temperature as a result of heat exchange with the anode, the vacuum degassing container is heated to high temperatures quickly and effectively relatively independently of the dimension and form such as size and chamber length.

A plasma torch 5 and an anode 6 are assembled into a unit in FIG. 2, facilitating the inserting and extracting operations. As the unit is mount to the roof portion of the degassing container 1, the damage due to heat is small. The nozzle 20 for jetting gas is used in one or two pieces and arranged in a direction downwards and eccentrically as shown in FIG. 3 and, in conformity therewith, a passage opening 25 of jet gas is provided in the anode 6, and the heat gas elevated in temperature in the passage opening transfers heat to the degassing container 1 whirling therein.

In the embodiment illustrated in FIG. 4, an anode 6 forms a part of the side wall of a vacuum degassing container 1, a plasma torch 5 is inserted toward the anode 6 in the upper side portion of the degassing container, and a gas jet nozzle 20 is further inserted from behind the anode 6 as shown in the figure. The relative positions of these elements may be such that plasma jet 13 and jet gas 26 are directed considerably eccentric as shown in FIG. 5, the whirling force is more increased as compared with the case in FIG. 4, and the heat transfer to the degassing container is thereby increased. The upper space above the degassing container is not required to be large, since the plasma torch 5 is inserted on the side of the degassing container 1.

In the embodiment illustrated in FIG. 6, an anode 6 and a gas jet nozzle are further united, thus facilitating the inserting and extracting operations.

A nozzle-inserted opening 29 for jetting gas serves also as a jet gas passage opening where heat exchange between the anode 6 and the heat gas is performed. The anode itself may act also as a gas jet nozzle by forming the nozzle inserting opening of the anode 6 into the same shape as a known proper jet nozzle and guiding gas thereinto. The plasma torch 5, the anode 6, and the jet gas 26 may be used in a plurality of sets as shown in FIG. 7. Those elements are directed considerably eccentric as in the case with FIG. 4, thereby increasing the whirling force of a gas and elevating the effect of convectional heat transfer.

A practical example of the present invention is presented here in which the method illustrated in FIG. 4 is employed for heating the vacuum degassing container of RH type lined with high aluminous refractories, of 1,100 mm in inside diameter, 4,400, in inside height, and having a molten steel treating capacity of 50 tons. Two sets of combination of the plasma torch, anode, and gas jet nozzle shown in FIG. 4 are used and a nitrogen gas mixer is used as a gas cooling means in this example. The used plasma torch is of a transferred type comprising a water-cooled copper nozzles for constricting plasma, tungsten cathodes, and insulators, and having 5,000 A output; and argon is used as a working gas. A roughly 100 mm wide gap is formed first between one plasma torch and the anode, argon is poured at a rate of 30 to 60 Nl/min, direct current voltage of 220 volt is applied from a direct current power source, and high frequency discharge is carried out in the plasma torch from a high frequency power source; then pilot arc is developed from the tip of the torch. When the torch is subsequently approached as near as 20 - +mm to the anode, a plasma develops. The torch is thereafter pulled up to maintain a distance from 400 to 500 mm to the anode and the working argon is supplied at a rate of 200 to 250 Nl/min, thus obtaining stable plasma jet. The other is then operated to develop a plasma, and each torch heats the graphite anode to red heat. Thereafter nitrogen gas is introduced from the gas mixer and jetted by the heat-resistant blower into the container to replace the inside atmosphere with nitrogen, thus heating the vacuum degassing container. With the total plasma output of 1,300 KW and circulating rate of nitrogen gas of 6,000 $Nm^3/h$, the lower one-third part of the degassing container is heated to about 1,600° C, the middle part to 1,400° C, and the upper part to 1,200° C. The time required for heating is less than 3 hours, although about 5 hours is necessary for the conventional methods. Owing to the preliminary heating sufficient as compared with the conventional method, the temperature drop of the molten steel during vacuum degassing treatment in about 20 minutes is reduced less than 63° C as compared with 73° to 76° C for the conventional methods.

We claim:

1. A method for heating a vacuum degassing container intended to degass molten steel while circulating the latter through said container under vacuum, which comprises disposing within said container a plasma torch formed of a cathode and a nozzle and spaced therefrom an anode composed of a high melting point material which is capable of high temperature radiation upon heating, and generating a plasma arc between said anode and cathode by connecting an electric power source thereacross to heat said anode to high temperature and transmit to the interior of said container radiant heat emanating from the body of said anode.

2. A method according to claim 1, which further includes disposing a gas jet nozzle in the direction toward said anode, removing a stream of ambient gas from said container and directing the same under pressure through said nozzle and against said anode to distribute throughout the container convection heat carried by said ambient gas in addition to the heat radiated by said anode.

3. A method according to claim 1, wherein the said high melting point material is graphite.

* * * * *